(12) United States Patent
Watanabe

(10) Patent No.: US 7,904,665 B2
(45) Date of Patent: Mar. 8, 2011

(54) MULTIPROCESSOR SYSTEM AND ITS OPERATIONAL METHOD

(75) Inventor: Yoshiaki Watanabe, Yamanashi (JP)

(73) Assignee: NEC Computer Techno, Ltd., Kofu-shi, Yamanashi (JP)

( * ) Notice: Subject to any disclaimer, the term of this patent is extended or adjusted under 35 U.S.C. 154(b) by 452 days.

(21) Appl. No.: 11/657,045

(22) Filed: Jan. 24, 2007

(65) Prior Publication Data
US 2007/0174557 A1 Jul. 26, 2007

(30) Foreign Application Priority Data

Jan. 26, 2006 (JP) ................................. 2006-017533

(51) Int. Cl.
G06F 12/00 (2006.01)
(52) U.S. Cl. ... 711/146; 711/143; 711/144; 711/E12.033
(58) Field of Classification Search .................. 711/146
See application file for complete search history.

(56) References Cited

U.S. PATENT DOCUMENTS

| 5,367,654 | A | * | 11/1994 | Furukawa et al. | ............ | 711/158 |
| 5,522,058 | A | * | 5/1996 | Iwasa et al. | .................... | 711/145 |
| 5,581,729 | A | * | 12/1996 | Nishtala et al. | ................ | 711/143 |
| 5,634,068 | A | * | 5/1997 | Nishtala et al. | ................ | 711/141 |
| 5,659,709 | A | * | 8/1997 | Quach | ........................... | 711/146 |
| 5,860,110 | A | * | 1/1999 | Fukui et al. | .................... | 711/141 |
| 5,893,160 | A | | 4/1999 | Loewenstein et al. | | |
| 5,913,226 | A | * | 6/1999 | Sato | .............................. | 711/146 |
| 6,490,657 | B1 | * | 12/2002 | Masubuchi et al. | ........... | 711/135 |
| 6,505,273 | B2 | * | 1/2003 | Taroda et al. | ................. | 711/112 |

(Continued)

FOREIGN PATENT DOCUMENTS

JP 6-110844 4/1994

(Continued)

OTHER PUBLICATIONS

Japanese Office Action dated May 27, 2010 with English translation thereof.

Primary Examiner — Reginald G Bragdon
Assistant Examiner — Daniel J Bernard
(74) Attorney, Agent, or Firm — McGinn IP Law Group, PLLC

(57) ABSTRACT

The multiprocessor system includes multiple cells having identical functions, and each of the multiple cells has a processor, a cache memory, and a main memory. The multiple cells include the first cell as a request cell, the second cell as a home cell, and the third cell as an owner cell. The latest version of the target data stored in the main memory of the second cell is stored in the cache memory of the third cell. When the first cell issues a read request for the target data to the second cell, the second cell issues a snoop request to the third cell in response to the read request. The third cell directly transmits the target data to the first cell in response to the snoop request. Also, the third cell issues the reply write back to the second cell in response to the snoop request. The first cell issues a request write back to the same address as that of the target data in the second cell. The second cell discards the reply write back when the reply write back from the third cell is received later than the request write back from the first cell.

15 Claims, 10 Drawing Sheets

U.S. PATENT DOCUMENTS

| | | | |
|---|---|---|---|
| 6,516,391 B1 * | 2/2003 | Tsushima et al. | 711/146 |
| 6,584,580 B1 * | 6/2003 | Yamamoto et al. | 714/10 |
| 6,681,293 B1 * | 1/2004 | Solomon et al. | 711/122 |
| 6,751,705 B1 * | 6/2004 | Solomon et al. | 711/122 |
| 6,901,485 B2 | 5/2005 | Arimilli et al. | |
| 2002/0124146 A1 * | 9/2002 | Shinkawa et al. | 711/151 |
| 2003/0009631 A1 * | 1/2003 | Arimilli et al. | 711/135 |
| 2007/0156972 A1 * | 7/2007 | Uehara et al. | 711/146 |

FOREIGN PATENT DOCUMENTS

| | | |
|---|---|---|
| JP | 10-105464 | 4/1998 |
| JP | 11-219343 | 8/1999 |
| JP | 2000-67024 | 3/2000 |
| JP | 2000-259596 | 9/2000 |
| JP | 2003-44456 | 2/2003 |
| JP | 2003-216597 | 7/2003 |

* cited by examiner

DIRECTORY 4-j

| DATA ADDRESS OF MAIN MEMORY 5-j | STATUS | OWNER CELL INFORMATION |
|---|---|---|
| A0 | P | CELL No, |
| A1 | S | (C3,C2,C1)=(0,1,1) |
| A2 | U | N/A |
| ⋮ | ⋮ | ⋮ |

| REQUEST | INDEX | | UPDATE | |
|---|---|---|---|---|
| | STATUS | OWNER CELL INFORMATION | STATUS | OWNER CELL INFORMATION |
| READ | U | — | P | REQUEST CELL No. |
| READ | S | BIT MAP CORRESPONDING TO THE REQUEST CELL No.=0 | NC | BIT MAP CORRESPONDING TO THE REQUEST CELL No.=1 |
| READ | S | BIT MAP CORRESPONDING TO THE REQUEST CELL No.=1 | NC | NC |
| READ | P | =REQUEST CELL No. | NC | NC |
| READ | P | ≠REQUEST CELL No. | NC | NC (UPDATE BY WRITE BACK) |
| REQUEST WRITE BACK | P | =REQUEST CELL No. | U | — |
| REQUEST WRITE BACK | P | ≠REQUEST CELL No. | NC | REQUEST CELL No. |
| REPLY WRITE BACK | P | ≠REQUEST CELL No. | U (UPDATE REQUEST) | — |

FIG. 9

| CELL C1 | | | | CELL C2 | | | | | | CELL C3 |
|---|---|---|---|---|---|---|---|---|---|---|
| CACHE STATUS OF CPU 2-1-1 | | SNOOP CONTROL TABLE 31 | | | | DIRECTORY 4-2 | | | | CACHE STATUS OF CPU 2-3-1 |
| | STEP | V BIT | ADDRESS INFORMATION | CELL INFORMATION | WRITE BACK DETECTION INFORMATION | | ADDRESS | STATUS | OWNER CELL | |
| I(INVALID) | INITIAL STATUS | 0 | — | — | — | | A0 | P | C3 | M(MODIFIED) |
| — | S12 | 1 | A0 | C1 | (0,-) | | A0 | P | C3 | M |
| — | S13 | 1 | A0 | C1 | (0,-) | | A0 | P | C3 | M→I |
| — | S16 | 1 | A0 | C1 | (0,-) | | A0 | P | C3 | — |
| E | S17 | 1 | A0 | C1 | (0,-) | | A0 | P | C3 | — |
| M→I | S18 | 1 | A0 | C1 | (0,-) | | A0 | P | C3 | — |
| — | S19 | 1 | A0 | C1 | (1,U) | | A0 | P | C3 | — |
| — | S20 | 1 | A0 | C1 | (1,U) | | A0 | P | C3 | — |
| — | S21 | 1 | A0 | C1 | (1,U) | | A0 | P | C3 | — |
| — | S22 | 1 | A0 | C1 | (1,U) | | A0 | U | — | — |

FIG. 11

MULTIPROCESSOR SYSTEM AND ITS OPERATIONAL METHOD

BACKGROUND OF THE INVENTION

1. Field of the Invention

The present invention relates to a distributed shared memory type multiprocessor system configured using multiple cells. In particular, the present invention relates to a coherency technology in distributed shared memory type multiprocessor systems having multiple cells.

2. Description of the Related Art

In the field of computer systems, "a multiprocessor system" consisting of multiple processors is known. Among the multiprocessor systems, those which are constituted of multiple cells (or multiple nodes) wherein multiple cells are connected by buses and switches are well known. Each of the multiple cells independently contains a processor and main memory, and a "shared memory" is configured logically with all main memories (For example, referred to the Japanese Patent Laid Open Nos. 2000-67024, 2000-259596, 1994-110844, 1999-219343, and 2003-216597). Memories are distributed and shared by multiple processors so that the multiple processors may be also called a "distributed shared memory type (DSM) multiprocessor system" or "distributed shared memory type architecture".

FIG. 1 is a block diagram showing a configuration of a distributed shared memory type multiprocessor system 1. The multiprocessor system 1 shown in FIG. 1 is composed of multiple cells C1 to Cn (n is an integer showing the number of cells) and a cross over switch 9 mutually connecting these multiple cells C1 to Cn. Each cell Cj (j is an integer that is greater than 1, but less than n) has at least one CPU (microprocessor) 2-j-1 to 2-j-m (m is an integer showing the CPU number within each cell) and main memory (local memory) 5-j. Each of the CPUs 2 loads at least one cache memory (stored-in-cache) 7. A shared memory is composed of all of the main memories 5-1 to 5-n that have been distributed and the shared memory can be referred by all CPUs 2.

In this distributed shared memory type multiprocessor system 1, while using cache 7, each CPU 2 accesses the data stored in the main memory 5-1 to 5-n, and also performs updating. When using a write back method for data updating, the updated data remains in the cache 7 so that there is a possibility that the latest data may not be present in the main memory 5-j. At this point, if multiple CPUs 2 try to reference/update the identical memory area, correct results cannot be obtained due to incoherency of the data. Thus, in the multiprocessor system, it is important to assure consistency of the data (referred to as "cache coherency") in order for each CPU 2 to enable accessing the latest data. One should consider the fact that it is important to maintain coherency among multiple cells C1 to Cn as well as maintaining coherency among cache 7 within each cell Cj.

As a coherency protocol, a "Directory-based Cache Coherency Protocol" and "Snooping Cache Coherency Protocol" are known.

According to the directory-based cache coherency protocol, a table (directory) is installed to manage the status of caching regarding the data stored in the main memory. When a certain CPU accesses data where the CPU is present, the information regarding the caching status stored in the directory is initially investigated. If the desired latest data are determined to be present in only a certain cache instead of in the main memory, the CPU accesses its data for that cache.

According to the snooping cache coherency protocol, when a certain CPU accesses data of a certain access address, all caches examine whether they own copies of the data of that access address. Each cache changes their own status (cache status) to enable acquisition of the latest data, if necessary. For example, according to MESI protocol, the following four cache statuses are provided: "I: invalid", "S: shared (the latest data are present in the main memory and in multiple caches), "E: Exclusive (the latest data are present in the main memory and its own cache)", and "M: modified (the latest data are present only in its own cache".

In each of the cells C1 to Cn shown in FIG. 1, in order to implement the aforementioned cache coherency, cache coherency circuits 3-1 to 3-n and directories 4-1 to 4-n are installed. A directory 4-j is a memory area implemented by DRAM and the like, and it stores information for managing the caching status regarding the data stored in the main memory 5-j of its own cell Cj. More specifically, the directory 4-j stores a table showing the cell caching the latest data regarding the data stored in the main memory 5-j of its own cell Cj. The cell caching the latest data can be its own cell or an other cell. The cache coherency circuit 3 is configured such that the coherency among the cells C1 to Cn is assured by referring to the directory 4. The cache coherency in each cell can be implemented, for example, by the snooping cache coherency protocol.

A cell loading the CPU 2 which is an issuing source for issuing a read request for certain data are hereinafter referred to as "a request cell CR". A cell loading the main memory 5 wherein the data to be accessed is stored is hereinafter referred to as "a home cell CH". Also, a cell having a cache 7 caching the latest version (latest data) of the data to be accessed is hereinafter referred to as "an owner cell CO". The inventors of the present application focused at the fact that in the multiprocessor system 1 using the directory 4, a status occurs with a different request cell CR, home cell CH and owner cell CO.

Operational examples of the conventional multiprocessor system in such a state will be explained with reference to FIG. 2. Initially, the CPU 2 of the request cell CR issues a read request to the home cell CH having the main memory 5 storing the data to be accessed (Step S1). The home cell CH searches (retrieves) its own directory 4 in response to the read request. From the information stored in the directory 4, the home cell CH detects the fact that the latest version of the target data is stored in the cache 7 of the owner cell CO. Then, the home cell CH issues a snoop request to the owner cell CO (Step S2).

In response to the snoop request, the owner cell CO reads out the latest data from the cache 7. In order to rewrite the latest data in the main memory 5 of the home cell CH, the owner cell CO issues a write back to the home cell CH (Step S3). The write back issued by the owner cell CO in response to the snoop request is hereinafter referred to as "reply write back". Simultaneously with this reply write back, the owner cell CO directly transmits the latest data read as a reply data to the request cell CR (Step S3'). As a result, the latency from the issuing of the read request to the reception of the reply data can be implemented by 3HOP (Steps S1, S2, S3') (The latency between the cells is considered as 1 HOP).

The CPU 2 of the request cell CR issuing the read request stores the reply data received in its own cache 7. Subsequently, in the case when the reply data of the cache 7 is replaced, there is a possibility of the generation of a write back from the request cell CR to the home cell CH (Step S3"). The write back issued when the CPU 2 replaces the cache 7 is hereinafter referred to as a "request write back". Since the aforementioned reply write back (Step S3) and the request write back (Step S3") are performed by a different path, the order is not always determined unconditionally. If Step S3 is carried out "later" than Step S3", the latest data updated by the request cell CR in the main memory 5 of the home cell CH is overwritten by the old data from the owner cell CO. That is, if Step S3 is different from Step S3", there is a problem that the coherency is not always assured.

In order to solve this problem, an operational example will be explained with reference to FIG. 3. Initially, the request cell CR issues a read request to the home cell CH (Step S1). Next, the home cell CH issues a snoop request to the owner cell CO (Step S2). In response to the snoop request, the owner cell CO reads the latest data from the cache 7 and issues a reply write back to the home cell CH (Step S3). Here, the owner cell CO does not directly transmit the latest data to the request cell CR. Next, the home cell CH updates its own main memory by the latest data in response to the reply write back. Later, the home cell CH transmits the latest data as a reply data to the request cell CR (Step S4).

By this processing, the occurrence of the relationship between the Step S3 and Step S3" as shown in FIG. 2 is prevented so that it is possible to assure coherency between cells. However, in the case of the processing shown in FIG. 3, the latency from issuing of the read request to the reception of the reply data becomes 4 HOP (Steps S1, S2, S3, S4). This implies a reduction in the processing speed. Basically, multiple processors are used in the multiprocessor system in order to improve processing speed so that the aforementioned reduction in processing speed is a serious problem.

SUMMARY OF THE INVENTION

Thus, an object of the present invention is to enable both assuring coherency and improving processing speed. That is, the purpose of the present invention is to provide technology enabling suppression of latency regarding read requests within 3HOP or less.

The means for solving problems will be explained below using the numbers and encodes used in the preferred embodiments of the present invention. These numbers and encodes are added with parentheses in order to clarify the relationships of the descriptions of "What is claimed is" and "Detailed Description of the Preferred Embodiments". However, these numbers and encodes should not be used for the interpretation of the technical scope of the invention as described in the "What is claimed is"

A multiprocessor system (1) of an embodiment of the present invention includes multiple cells (C1 to Cn) and a network (9) which connects among the multiple cells (C1 to Cn). Each cell (Cj) includes a processor (2), a directory (4), a cache memory (7), and a main memory (5). Multiple cells (C1 to Cn) include request cells (CR), home cells (CH), and owner cells (CO). The latest version of the target data stored in the main memory (5) of the home cell (CH) is stored in the cache memory (7) of the owner cell (CO).

The request cell (CR) issues a read request for the target data to the home cell (CH). The home cell (CH) issues a snoop request to the owner cell (CO) in response to the read request. The owner cell (CO) directly transmits the latest data to the request cell (CR) in response to the snoop request. As a result, the latency from issuing the read request to the reception of reply data can be implemented by 3HOP.

Also, the owner cell (CO) transmits the reply write back to the home cell (CH) in response to the snoop request. The request cell (CR) issues a request write back for the same address as the aforementioned target data in the home cell (CH). The request write back includes the directory updating information in order to enable coherency between the status of the cache (7) included in the request cell (CR) and the status of the directory (4) in the home cell (CH). The home cell (CH), if the reply write back from the owner cell (CO) is received after the request write back from the request cell (CR), aborts the reply write back, and also updates the status of the directory (4) based on the directory update information.

This configuration prevents the data updated by the request write back from the request cell (CR) from being overwritten by the old data by the reply write back from the owner cell (CO). Thus, despite the fact that the pathways are different between the request write back and the reply write back, assurance of coherency is enabled. In other words, even though the owner cell (CO) transmits the reply data directly to the request cell (CR), coherency among the cells can be maintained.

According to the multiprocessor system of the present invention, even though the request cell CR, the home cell CH and the owner cell CO are different, it is possible to make the latency from the issuing of the read request to the reception of the reply data to be 3HOP. In addition, assurance of coherency among cells is enabled. That is, both assurance of coherency and shortening of the latency (improvement in processing speed) can be implemented.

BRIEF DESCRIPTION OF THE DRAWINGS

FIG. 9 is a table showing an abstract of the method of updating the directory concerned in the present embodiment.

FIG. 11 shows cache statuses, a snoop management table and a table showing transition of the information stored in the directory.

DETAILED DESCRIPTION OF THE PREFERRED EMBODIMENTS

The multiprocessor system concerned in the embodiment of the present invention is explained with reference to the attached drawings.

1. Concept

Figures 4, 5:
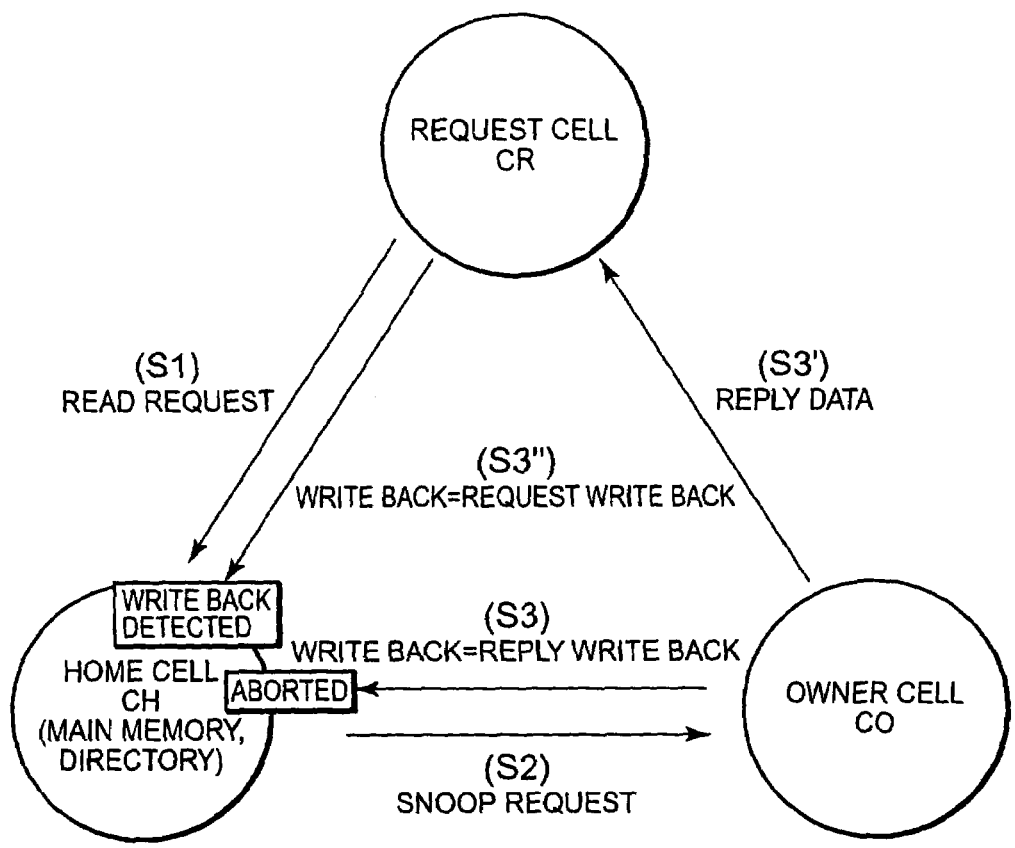
FIG. 4 is a conceptual view showing operations of the multiprocessor system of the present invention.
FIG. 5 is a table showing an example of the information stored in the directory concerned in the embodiment of the present invention.

The operations of the multiprocessor system concerned in the present embodiment are explained with reference to FIG. 4. In FIG. 4, the request cell CR loads a CPU where a read request is a source issuing a read request. The home cell CH has a main memory wherein data to be accessed is stored. The owner cell CO has a cache caching the latest version of the data to be accessed (latest data). Here, the case when the request cell CR, the home cell CH and the owner cell CO are different is considered.

Initially, CPU of the request cell CR issues a read request to the home cell CH having access target data (Step S1). The home cell CH searches (retrieves) its own directory in response to the read request. From the information stored in the directory, the home cell CH detects that the latest version of the target data are stored in the cache of the owner cell CO. Thus, the home cell CH issues a snoop request to the owner cell CO (Step S2).

The owner cell CO reads out the latest data from the cache in response to the snoop request. Then, the owner cell CO issues a reply write back for the home cell CH in order to rewrite the latest data in the main memory of the home cell CH (Step S3). At the same time as this reply write back, the owner cell CO directly transmits the latest data which has been read as a reply data to the request cell CR (Step S3'). As a result, the latency from the issuing of the read request to the reception of the reply data can be implemented by 3HOP (Steps S1, S2, S3').

The CPU of the request cell CR that issued the read request stores the reply data received in its own cache. Subsequently, in the case when the data in the cache is replaced, the request cell CR issues a request write back to the home cell CH (Step S3"). Since the aforementioned reply write back (Step S3) and the request write back (Step S3") are performed through different paths, the order is not always determined unconditionally.

The cells according to an embodiment of the present invention have a function of registering the read request received in a specified table. Also, the cells according to an embodiment of the present invention have a function of making the detection flag effective when detecting the request write back for the same target address as that of the registered read request. Moreover, the cells according to an embodiment of the present invention have a function of "discarding" the received reply write back by referring to the aforementioned detection flag when receiving the reply write back (Step S3) later than the request write back (Step S3"). In other words, the cells according to an embodiment of the present invention have a function of discarding the reply write back when detecting the request write back (Step S3") during the period from the time when issuing the snoop request (Step S2) to the reply write back (Step S3).

By so doing, it prevents the data updated by the request write back from the request cell CR from being overwritten by the old data by the reply write back from the owner cell CO in the home cell CH. Thus, even though Step S3 is different from Step S3", it is possible to assure coherency. In other words, even though the owner cell CO directly transmits the reply data to the request cell CR (Step S3'), coherency among the cells can be maintained. In contrast, while assuring the coherency, the latency from the time when issuing the read request to the time receiving the reply data can be implemented by 3HOP. That is, both assurance of coherency and shortening of the latency (improvements in processing speed) can be implemented.

2. Configuration

2-1. Overall Configuration

Specific configuration examples to implement the processing concerned in the present embodiment will be explained below. The multiprocessor system concerned in the present embodiment is a distributed shared memory type multiprocessor system and the overall configuration is the same configuration shown in FIG. 1. That is, the distributed shared memory type multiprocessor system 1 concerned in the present embodiment includes multiple cells (nodes) C1 to Cn (n is an integer showing the number of cells), and a crossbar switch 9 connecting among the multiple cells C1 to Cn. The multiple cells C1 to Cn can be connected to each other by a network such as shared buses and data links and the like.

The multiple cells C1 to Cn have the same function. Each cell Cj (j is an integer of 1 or greater and n or less) includes at least one CPU (microprocessor) 2-j-1 to 2-j-m (m is an integer showing the number of CPUs in each cell), and a main memory (local memory) 5-j. Each of the CPUs 2 carries at least one cache memory (store-in-cache) 7. A shared memory is composed of all of the main memories 5-1 to 5-n that are installed distributedly and the shared memory is referenced by all CPUs 2.

If a single cell has several caches 7, local cache coherency in the cell is implemented, for example by the "snooping cache coherency protocol". In this case, the cache 7 loaded in each CPU 2 manages the cache status for example based on the MESI protocol. According to the MESI protocol, the following four cache statuses: "M (modified)", "E (exclusive)", "S (shared)", and "I (invalid)" or "U (uncached)" are provided:

M (Modified): The data in the cache is present only within the cache, and I is not identical to the data within the main memory. Namely, the latest data are present only in its cache.

E (Exclusive): The data in the cache is present only within the cache among multiple caches, and is identical to the data within the main memory. Namely the latest data are present in its cache and main memory.

S (Shared): The data in the cache is present in its cache and in the cache of other CPU, and is identical to the data in the main memory. Namely the latest data are present in multiple caches and in the main memory.

I (Invalid), U (Uncached): The data in the cache is invalid. Namely, the latest data are present in the main memory, but not in its cache.

The cache protocols that are applied to the present invention are not limited to the aforementioned MESI protocols. As long as cache status M (Modified) can be provided, any of the cache protocols can be applied.

Figure 1:
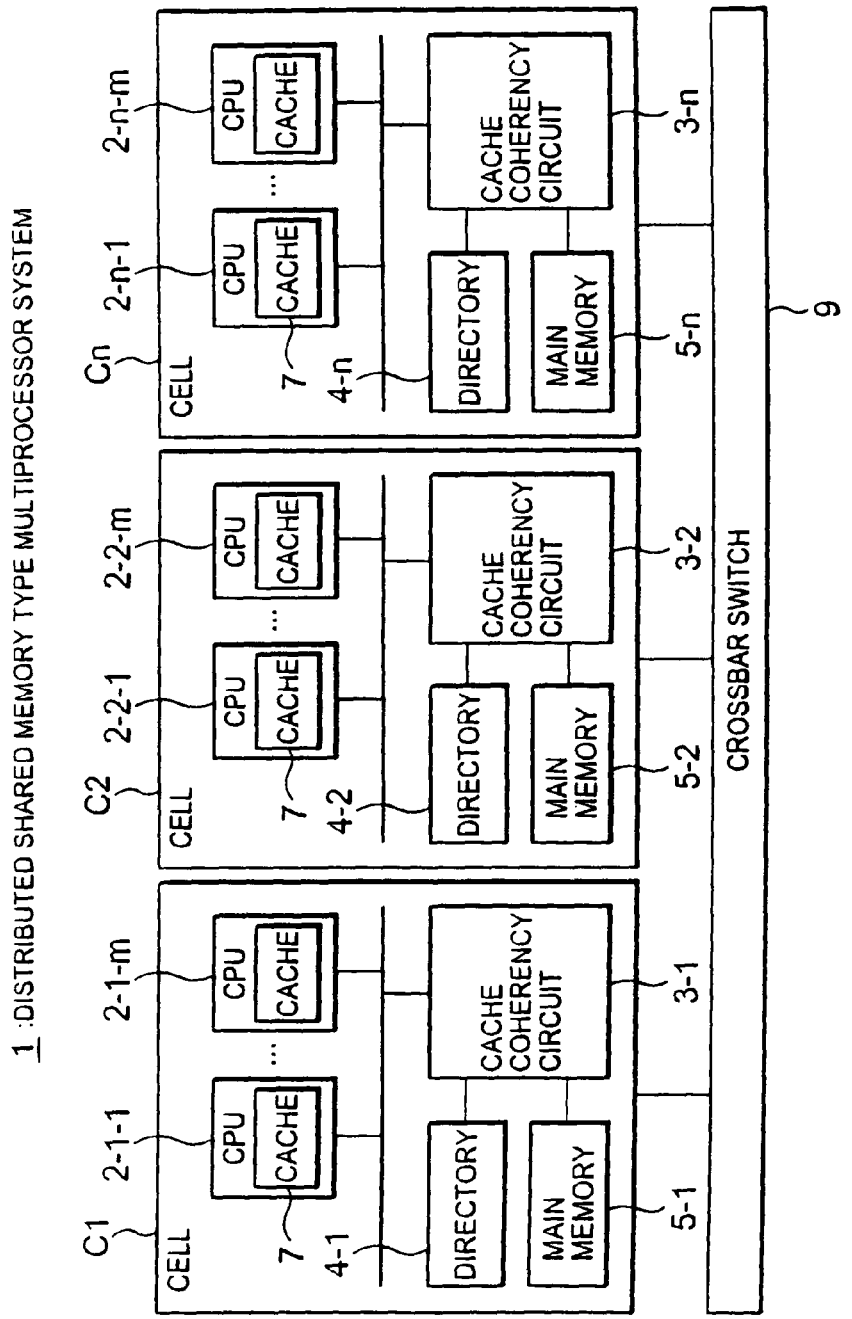
FIG. 1 is a block diagram showing a configuration of the distributed shared memory type multiprocessor system.
Figure 2:
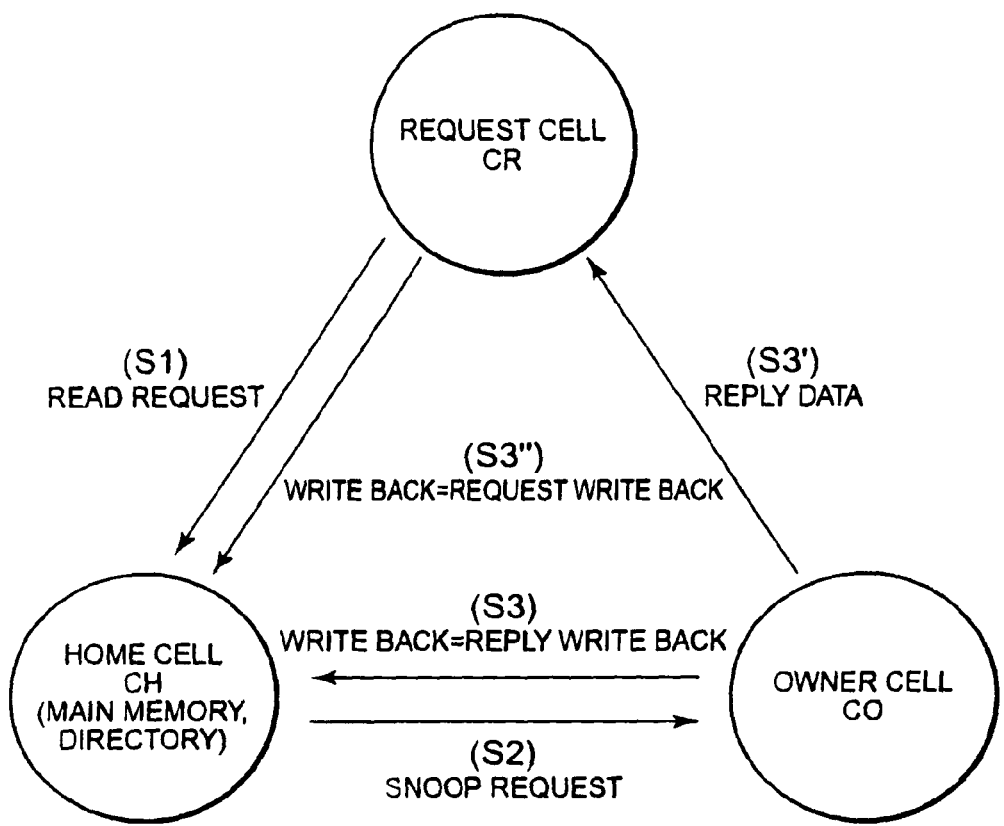
FIG. 2 is a conceptual view showing operations of the conventional multiprocessor system.
Figure 3:
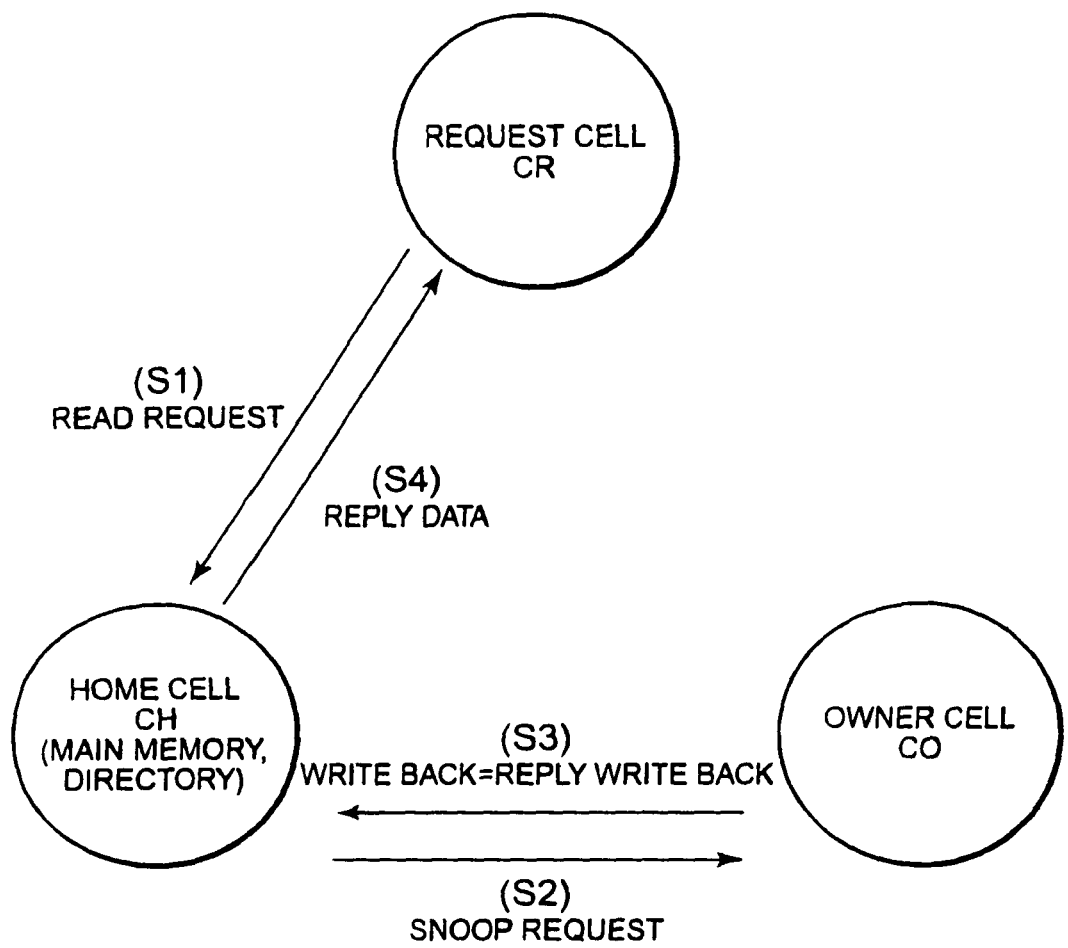
FIG. 3 is a conceptual view showing operations of the conventional multiprocessor system.

Also, not only the cache coherency within the cells must be maintained, but also it is important to maintain cache coherency among multiple cells C1 to Cn shown in FIG. 1. According to the present embodiment, cache coherency among multiple cells C1 to Cn is controlled based on "the directly-based cache coherency protocol". For this reason, in each of cells C1 to Cn cache coherency circuit 3-1 to 3-n and a directory 4-1 to 4-n are installed.

The directory 4-j is a memory area implemented by DRAM and the like. In the directory 4-j, information for managing the status of caching regarding the data stored in the main memory 5-j of its own cell Cj is stored. More specifically, in the directory 4-j, the status of all data stored in the main memory 5-j of its own cell Cj, and a table showing the cell caching the latest version of the data (namely owner cell CO) are stored. The owner cell CO caching the latest data can be its own cell or can be other cells.

An example of the information stored in the directory 4-j is shown in FIG. 5. As shown in FIG. 5, the status (P, S, U) and the owner cell information are assigned to each data address of the main memory 5-j. For example, the status regarding the data address A0 is "P (private)". The status "P" indicates a possibility that the latest data are registered in the cache 7 of the only cell. All of "M", "E", "S" and "I" are allowed as cache status of the cache. As owner cell information, the cell number of the owner cell is registered.

Also, the status regarding data address A1 is "S". The status "S (shared)" indicates a possibility that the latest data are registered in the cache 7 of multiple cells. As a cache status of the cache 7, "S" or "I" is allowed. In this case, as owner cell information, bit maps corresponding to the cells C1 to Cn are registered. As an example, a case when the number of cells is three (n=3) and the latest data are stored in the cache 7 of the cell C1 and C2 is considered. In this case, bits corresponding to the cell C1 and the cell C2 among the bit maps of three bits are set to be "1" and the bit corresponding to the cell C3 is set to be "0": (cell C3, cell C2, cell C1)=(0, 1, 1). The owner information is managed by this bit map.

Also, the status regarding the data address A2 is "U (uncached)". Also, the status "U" indicates that the data in the main memory 5-$j$ is the latest data. In this case, none is particularly registered as owner cell information (N/A: not available). The statuses P, S U shown above can be described as cache statuses regarding the main memory 5-$j$.

By referring to the directory 4-$j$, the cache coherency circuit 3-$j$ concerned in the present embodiment performs coherency control among the cells C1 to Cn. Namely, cache coherency circuit 3-$j$ assures cache coherency using the directory 4-$j$ based on the directory-based cache coherency protocol. As will be explained below, the present invention is characterized in this cache coherency circuit 3-$j$.

2-2. Cache Coherency Circuit

Figure 6:
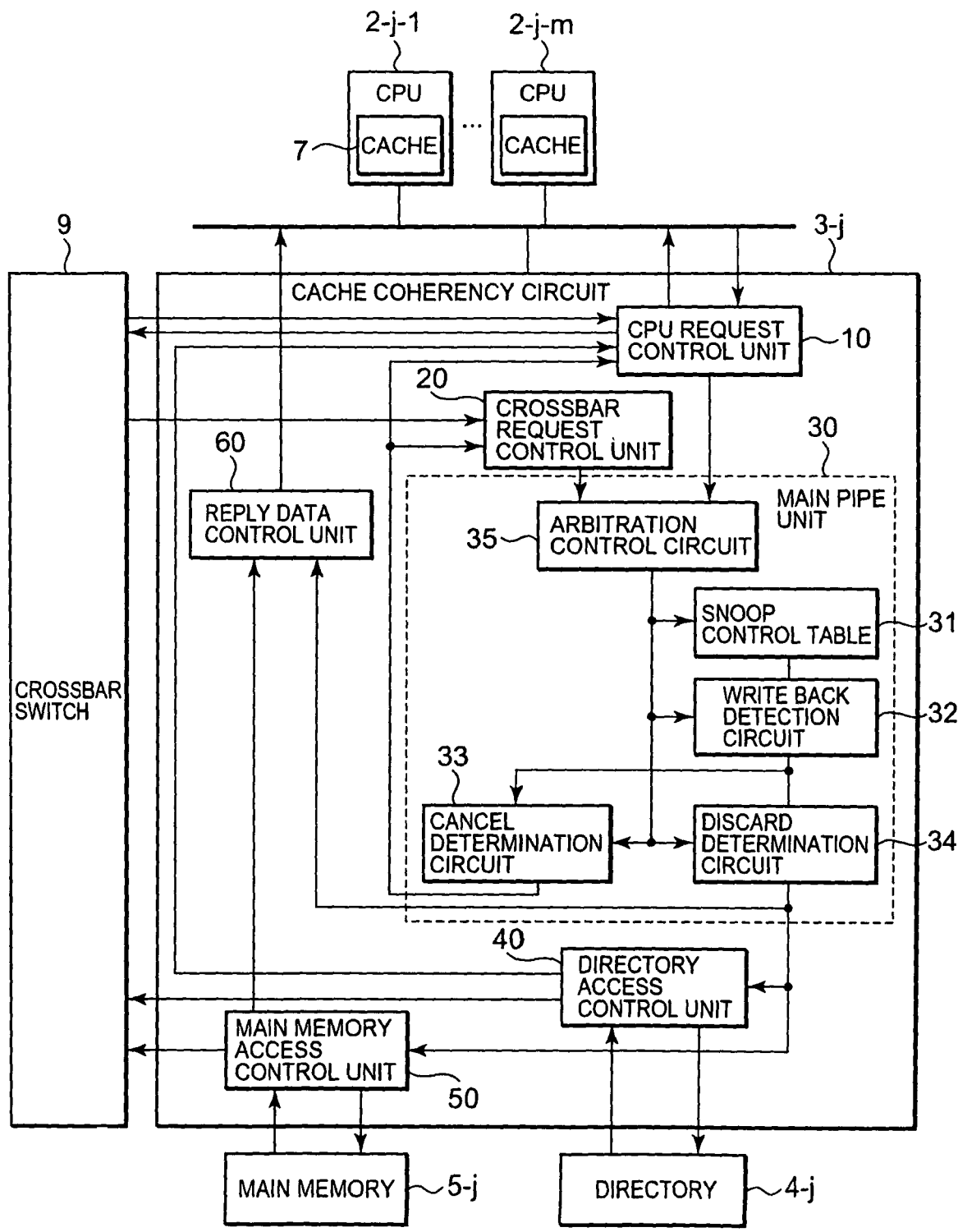
FIG. 6 is a block diagram showing a configuration of the cache coherency circuit concerned in the present embodiment.

FIG. 6 is a block diagram showing a configuration of the cache coherency circuit 3-$j$ of the cell Cj concerned in the present embodiment. In the cell Cj, the cache coherency circuit 3-$j$ is connected to plural numbers of CPU 2-J-1 to 2-$j$-$m$, directory 4-$j$, and main memory 5-$j$. Also, the cache coherency circuit 3-$j$ is connected such that communication to other cells is enabled via the crossbar switch 9. As shown in FIG. 6, the cache coherency circuit 3-$j$ has a CPU request control unit 10, a crossbar request control unit 20, a main pip0e unit 30, a directory access control unit 40, a main memory access control unit 50, and a reply data control unit 60. These units are configured such that they can correspond with each other with data and requests.

As requests, "read request", "snoop request", "reply write back" and "request write back" are available.

The read requests include read target addresses and the read request issuing sources. In the present example, the read target address is an address in the main memory 5 in the home cell CH and the issuing source is CPU 2 of the request cell CR. Namely, the read requests include at least information regarding the request cell CR and home cell CH.

In the snoop request, information of the read request is copied and the read target addresses and read request issuing source are included.

In the reply write back, information of the snoop request is copied and the read target addresses and read request issuing source are included. Moreover, write back data are included in the reply write back. The read target addressees are write back target addresses in which the write back data are rewritten.

The request write back includes write back data, write back target addresses, request write back issuing source, and directory updating information. In the present example, the write back target address is the address in the main memory 5 in the home cell CH, and the issuing source is CPU 2 of the request cell CR. The directory updating information is the information for coherency between the cache status of the cache 7 included in the request cell CR and the status of the directory 4 of the home cell CH. The directory updating information indicates how the status of the directory 4 of the home cell CH can be updated.

A CPU request control unit 10 has a function of processing the request from the CPU 2. More specifically, the CPU request control unit 10 receives the read request issued by the CPU 2 and transfers the read request to the main pipe unit 30 of its own cell or to the home cell CH in response to the read target addresses included in the read requests. Also, the CPU request control unit 10 receives the write back issued by the CPU 2, and transfers the write back to the main pipe unit 30 of its own cell or to the home cell CH in response to the write back target addresses included in the write back.

Moreover, the CPU request control unit 10 has a function of processing snoop requests for the CPU 2. More specifically, the CPU request control unit 10 transfers the snoop requests received from the crossbar switch or directory access control unit 40 to the CPU 2. Then, the CPU request control unit 10 directly transmits the reply data obtained from the cache 7 of the CPU 2 by the snoop processing to the request cell CR. As a result, the latency from the time when issuing read request to the time when receiving reply data can be shortened.

The crossbar request control unit 20 has a function of processing requests received from the crossbar switch 9. More specifically, the crossbar request control unit 20 transfers the read request received from the crossbar switch 9, reply write back and request write back to the main pipe unit 30.

The main pipe unit 30 has a function of arbitrating the requests received from the CPU request control unit 10 and the crossbar requests control 20, and also a function of controlling requests for the directory access control unit 40 and main memory access control unit 50. The detailed function of the main pipe unit 30 will be explained more precisely later in Section 2-3.

The directory access control unit 40 controls access to the directory 4. Specifically, the directory access control unit 40 performs retrieving (searching the directory 4 in response to the requests received from the main pipe unit 30 (read request, request write back, reply write back). According to the status of the directory 4 read out, the directory access control unit 40 issues a snoop request to the owner cell CO or CPU request control unit 10 of its own cell.

Also, the directory access control unit 40 updates the directory 4 in response to the request received from the main pipe unit 30. A method of updating the directory 4 depends upon the status of the directory 4 that has been read out and is regulated based on the specified rules (See FIG. 9). However, in the case of reply write back, updating of the directory 4 may be performed by a different method from the specified rules. In such a case, the directory access control unit 40 receives an "update request" from the main pipe unit 30. Then, the directory access control unit 40 updates the directory 4 as instructed by the update request.

The main memory access control unit 50 controls the access to the main memory 5. Specifically, the main memory access control unit 50 reads out the target data from the main memory 5 in response to the read request received from the main pipe unit 30. Then, the main memory access control unit 50 transmits the read data (read-out data) as reply data to the request cell CR or the reply data control unit 60 of its own cell. Also, the main memory access control unit 50 writes the write back data in the main memory 5 in response to the reply write back or request write back received from the main pipe unit 30.

The reply data control unit 60 has a function of transferring the reply data received from the main memory access control unit 50 or from the crossbar switch 9 to CPU 2.

2-3. Main Pipe Unit

Figure 7:
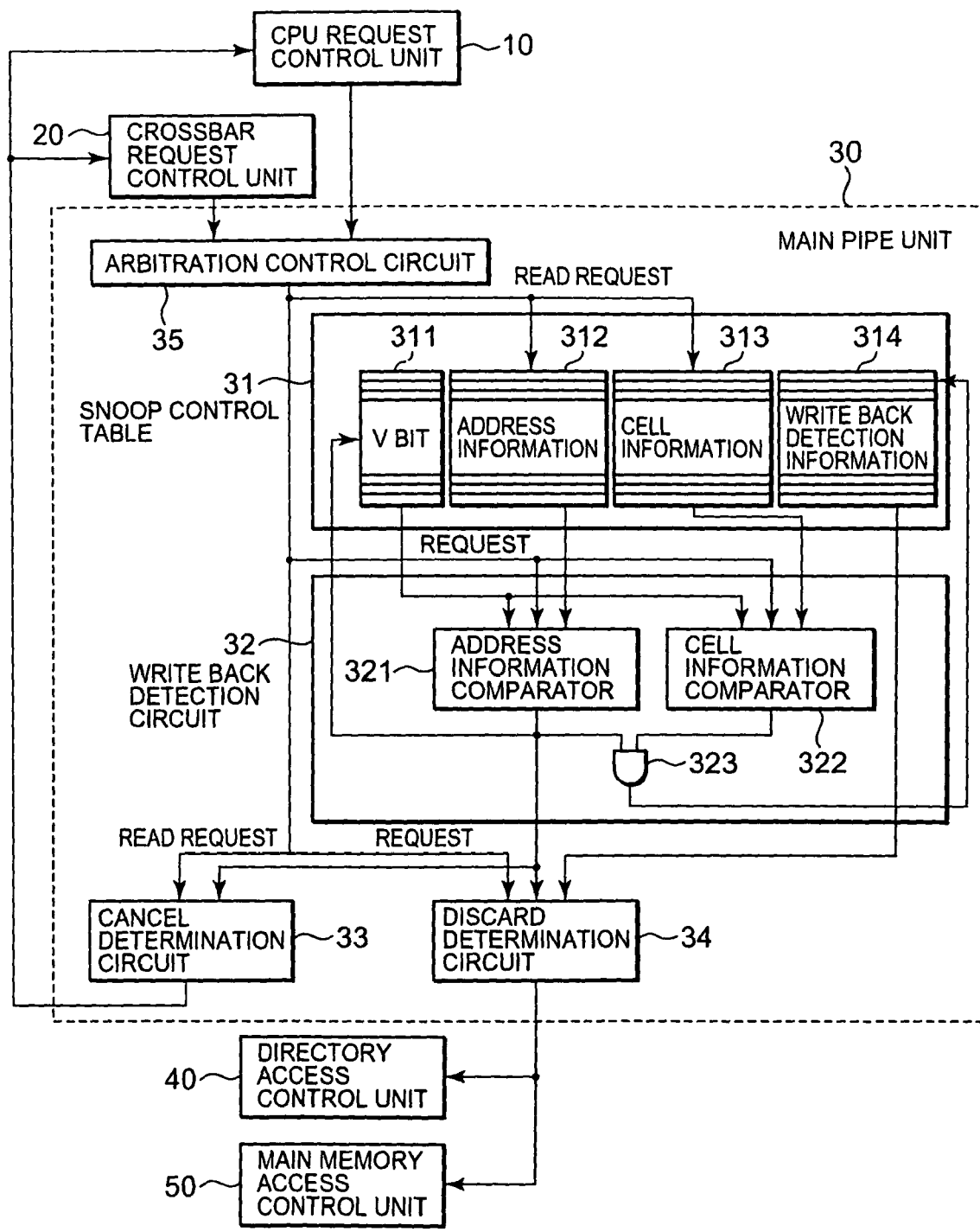
FIG. 7 is a block diagram showing a configuration of the main pipe unit concerned in the present embodiment.

FIG. 7 is a block diagram showing a configuration of the main pipe unit 30 concerned in the present embodiment. As shown in FIG. 7, the main pipe unit 30 includes a snoop management table 31, a write back detection circuit 32, a cancel determination circuit 33, a discard determination circuit 34, and an arbitration control circuit 35.

The arbitration control circuit 35 performs arbitration between the request from the CPU request control unit 10 and the request from the crossbar request control unit 20. The request after acquiring arbitration is transferred to the snoop management table 31, write back detection circuit 32, cancel determination circuit 33, and discard determination circuit 34.

Figure 8:
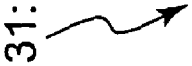
FIG. 8 is a table showing an example of the snoop management table concerned in the present embodiment.

The snoop management table 31 is a table where information is stored and multiple entries are stored. Each of the entries includes a valid bit 311, address information 312, cell information 313, and write back detection information 314. FIG. 8 shows an example of the snoop management table 31 in a certain cell. The valid (V) bit 311 shows whether the entry is a valid entry ("1") or an empty entry ("0").

As the address information 312, read target addresses showing read request (e.g., A0, A1) are stored. As the cell information (request cell information) 313, the numbers of cells at the issuing source that issued the read request (e.g.: C1, C3) are stored. As mentioned above, the cells according to an embodiment according to an embodiment of the present invention have a function of storing the read request received. As will be described later, multiple read target addresses (A0, A1) corresponding to multiple entries are controlled differently. Namely, the number of "certain read target addresses" included in the address information 312 is either 0 or 1. If the read request for a certain read target address has been registered, the read request to the same read target address is in a read request registration stand-by state.

The write back detection information 314 contains a detection flag and directory update information. The detection flag and the directory update information correspond to the registered address information 312 and cell information 313. The detection flag is a flag that indicates whether or not there is a write back from the request cell CR, namely whether or not the request write back is detected. When the detection flag is valid ("1"), a request write back for the read target address (A0) is detected. In contrast, the directory update information is an information showing in which status the directory 4 is updated and is setup at the same time when the detection flag is set to be "1". As will be described later, this directory update information is used when generating an update request.

Returning to FIG. 7, the write back detection circuit 32 includes an address information comparator 321, a cell information comparator 322, and AND 323. This write back detection circuit 32 receives the request transferred from the arbitration control circuit 35. Then, the write back detection circuit 32 detects "request write back" for each of the read target addresses shown by address information 312 by referring to the aforementioned snoop management table 31.

Specifically, the address information comparator 321 compares the write back target addresses indicated by the write back (reply write back or request write back) with the read target addresses shown by the address information 312 in the aforementioned snoop management table 31. Then, the address information comparator 321 outputs bit map data (number of bits total number of entries) showing agreement ("1")/disagreement ("0") with respect to all entries. In this case, if the V bit 311 is invalid, entries are determined to be automatically disagreement ("0"). In this bit map data, all bits are expressed by "0" or only one of the bits is "1". Those entries corresponding to "1" among the bit map data are referred to as "agreement entries".

In contrast, the cell information comparator 322 compares the number of the issuing source indicated by the request write back with the number of request cell CR indicated by the cell information 313 in the aforementioned snoop management table 31 when receiving the request write back. Then, the cell information comparator 322 outputs bit map data showing agreement ("1")/disagreement ("0") with respect to all entries. If the V bit 311 is invalid, entries are determined to be automatically disagreement ("0").

AND 323 outputs a logical product between the bit map data from the address information comparator 321 and the bit map data from the cell information comparator 322. In the bit map data output, all bits are expressed as "0" or only one bit is "1". Then the write back detection circuit 32 modifies the write back detection information 314 of the entries corresponding to "1" (agreement entries) among the bit map data. Specifically, the write back detection circuit 32 modifies the detection flag from invalid ("0") to valid ("1"), and also set up the directory modification information to the directory update information shown by the request write back. Namely, the directory update information is stored in the snoop management table 31 corresponding to the verified detection flag.

The fact that the output of AND 323 contains "1" means that "a request cell CR issues a read request to a certain address, and furthermore, the same request cell CR issues request write back to the same address". Namely, the write back detection circuit 32 is a circuit for detecting the request write back related to the read request that has been registered in the snoop management table 31. If the write back detection circuit 32 detects such a request write back, it sets up the detection flag of the agreement entries at "1". Therefore, the cells according to an embodiment according to an embodiment of the present invention have a function of validating the detection flag when detecting a request write back for the same target addresses as those of the registered read request. The information regarding the read request that has been stored in advance in the snoop management table 31 (address information 312, cell information 313) is considered as information for detecting the request write back which may be received later.

Also, the write back detection circuit 32 when receiving the reply write back, outputs address agreement entries output from the address information comparator 321 (bit map data) to the cancel determination circuit 33 and discard determination circuit 34. Also, the write back detection circuit 32 when receiving reply write back, invalidates V bit 311 regarding the address agreement entries ("0"). Namely, the write back detection circuit 32 initializes the entries related to the reply write back in response to the reply write back.

Next, a cancel determination circuit 33 will be explained. As mentioned above, if a read request for a certain read target address has already been registered in the snoop management table 31, the read request for the same read target address is set in a registration stand-by state. For this reason, a cancel determination circuit 33 is installed. The cancel determination circuit 33 receives a read request from the arbitration control circuit 35, and also receives outputs from the address information comparator 321 of the aforementioned write back detection circuit 32. If address agreement entries are output from the address information comparator 321, that is, if a read request to the same address as the read target address which has been registered in the snoop management table 31 is detected, the cancel determination circuit 33 requests reissuing of the read request for the CPU request control unit 10 and the crossbar request control unit 20. Then, the same operation is repeated until there is a free entry in the snoop management table 31. As a result, the read request is in a registration stand-by state.

The discard determination circuit 34 receives requests transferred from the arbitration control circuit 35 (read request, request write back, reply write back). If the request received is a read request, the discard determination circuit 34 outputs the read request to the directory access control unit 40 and the main memory access control unit 50. Also, if the request is a request write back, the discard determination circuit 34 outputs the request write back to the directory access control unit 40 and the main memory access control unit 50.

Also, if the request received is a reply write back, the discard determination circuit 34 receives outputs from the address information comparator 321 (bit map data) and references the write back detection information 314 of the address agreement entries shown by the bit map data. If the detection flag of the write back detection information 314 as referenced is "0", the discard determination circuit 34 outputs reply write back directory access control unit 40 and the main memory access control unit 50. In contrast, if the detection flag is "1", it means that the reply write back is entered after the request write back. In this case, the discard determination circuit 34 discards the reply write back received. Therefore, the reply write back is not output to the main memory access control unit 50. However, the discard determination circuit 34 issues an "update request" for updating the status of the directory 4 in the directory access control unit 40. The contents of instruction of the update request are determined by the "directory update information" in the write back detection information 314 as referenced.

As explained above, the main pipe unit 30 concerned in the present embodiment has (1) a function of registering a read request from the request cell CR, (2) a function of storing the detection results when detecting the request write back for the same target addresses as those for a read request as registered, (3) and a function of controlling requests for the directory access control unit 40 and the main memory access control unit 50. Specifically, when receiving a reply write back after a request write back, it includes a function of discarding the rely write back and updating the directory 4. The aforementioned function (1) is provided by snoop management table 31. The aforementioned function (2) is provided by write back detection circuit and snoop management table 31. The aforementioned function (3) is provided by discard determination circuit 34 and smooth management table 31. As a result, the operations shown in FIG. 4 are implemented FIG. 9 briefly shows the status of retrieving the directory 4 for various requests and the status after updating. The summary shown in FIG. 9 is referred in the following explanation of the operational examples.

3. System Operational Examples

Operational examples of a multiprocessor system 1 concerned in the present embodiment will be explained with reference to the previously mentioned FIG. 6, FIG. 7, FIG. 9 and the following drawings. In this operational example, the request cell CR, home cell CH and owner cell CO are assumed to be different from each other. For example, the request cell CR is represented by the cell C1, the home cell CH is represented by the cell C2, and the owner cell CO is represented by the cell C3. Namely, the target address to be read out by the CPU 2 of the request cell C1 (e.g., CPU 2-1-1) is an address in the main memory 5-2 loaded on the home cell C2, and the latest data corresponding to the address is stored in the cache 7 in the CPU 2 (e.g., CPU 2-3-1) loaded in the owner cell C3.

Figure 10:
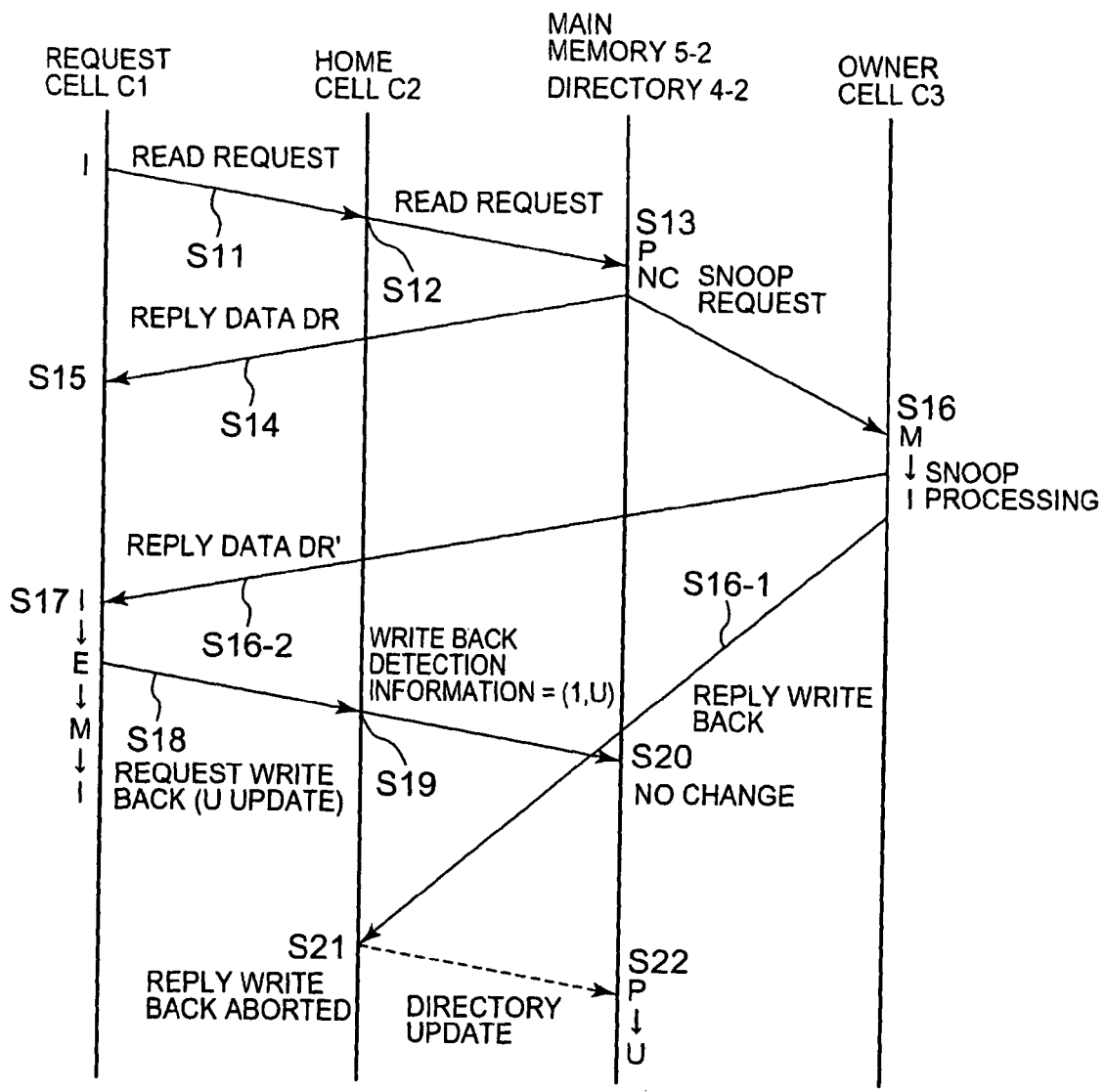
FIG. 10 is a diagram showing an example of the operational flow of the multiprocessor system concerned in the present embodiment.

FIG. 10 is a conceptual diagram showing a processing flow in the present operational example. FIG. 11 shows the cache status of CPU 2-1-1 in the request cell C1, snoop management table 31 and the contents of the directory 4-2 in the cache coherency circuit 3-2 in the home cell C2, and changes in the cache status of the CPU 2-3-1 of the owner cell C3. In the initial state, the cache status of the CPU 2-1-1 in the request cell C1 is "I (invalid)" and the cache status of the CPU 2-3-1 in the owner cell C3 is "M (Modified)". Also, in the directory 4-2 of the home cell C2, the status for the read target address A0 is expressed as "P" and the owner cell information is expressed as "cell C3".

Step S11: Request Cell C1: Issuing Read Request

Initially, CPU 2-1-1 in the request cell C1 issues a "read request" to the address A0 in the main memory 5-2 in the home cell C2. This read request contains a read target address A0 and the issuing source (CPU 2-1-1). When the CPU 2-1-1 issues a read request, a snoop processing is executed respectively in CPU 2-1-1 to CPU2-1-$m$ in the request cell C1. Specifically, it is investigated whether respective cache 7 of CPU 2-1-1 to CPU 2-1-$m$ stores data at the read target address A0.

If there are no cache hits, the read request is transmitted to the cache coherency circuit 3-1 in the request cell C1. The CPU request control unit 10 in the cache coherency circuit 3-1 receives a read request from the CPU 2-1-1. The CPU request control unit 10 determines the home cell C2 as an access target based on the read target address A0 included in the read request. The home cell C2 is unconditionally determined by the read target address A0. Then, the CPU request control unit 10 transmits a read request to the home cell C2 via the crossbar switch 9.

Step S12: Home Cell C2: Updating Snoop Management Table 31

The crossbar request control unit 20 of the cache coherency circuit 3-2 in the home cell C2 receives the read request via the crossbar switch 9 from the request cell C2. Then, the crossbar request control unit 20 transfers the read request received to the main pipe unit 30. The arbitration control circuit 35 of the main pipe unit 30 performs arbitration with the read request from its read request and the CPU request control unit 10.

When the read request acquires arbitration from the crossbar request control unit 20, the read request is transferred to the snoop management table 31, write back detection circuit 32, cancel determination circuit 33, and discard determination circuit. Then, the main pipe unit 30 registers its read request in the free entry of the snoop management table 31. In this case, as shown in FIG. 11, with respect to the entries registered for the read request, V-bit 311 is modified from "0" to "1" and the read target address A0 is registered as address information 312 and the number of the request cell C1 is registered as cell information 313, and the detection flag of the write back detection information 314 is set to "0".

If a read request for the same address A0 is present in the valid entry of the snoop management table 31 (V bit 311 "1" entry), the address information comparator 321 (See FIG. 7) detects the address agreement entry. Once the address agreement entry is detected, the cancel determination circuit 33 requests the crossbar request control unit 20 to reissue the read request. As a result, the read request is set in a registration stand-by state. Therefore, the phenomenon that plural numbers of read requests for the same address are stored in the snoop management table 31 can be prevented.

Subsequently, the main pipe unit 30 (discard determination circuit 34) transmits read requests to the directory access control unit 40 and the main memory access control unit 50.

Step S13: Home Cell C2: Directory Access

The directory access control unit 40 in the home cell C2 initially indexes directory 4-2 in response to the read requests received. As shown in FIG. 11, in the directory 4-2, the status for the read target address A0 is "P" and the owner cell information is "cell C3". In this case, the directory access control unit 40 issues a "snoop request" to the owner cell C3 via crossbar switch 9. The read request information is copied in the snoop request which includes read target address A0 and the read request issuing source (CPU 2-1-1 of the request cell C1).

Also, the directory access control unit 40 updates the directory 4-2 in response to the read request. With reference to FIG. 9, if the status is "P" during the time of retrieval for the read request, the status is not updated (NC: No changes). Moreover, the directory access control unit 40 outputs the status information "P" and the owner cell information "C3" to the main memory access control unit 50.

Step S14: Home Cell C2: Memory Access

On the other hand, the main memory access control unit 50 in the home cell C2 read the data out from the read target address A0 in the main memory 5-2 in response to the read request received. Then the main memory access control unit 50 imparts the status information "P" and the owner cell information "C3" that are received from the directory access control unit 40, to the data that has been read, in order to generate reply data DR. The memory access control unit 50 transmits the reply data DR via the crossbar switch 9 to the request cell C1.

Step S15: Request Cell C1: Reception of the Reply Data DR

The reply data control unit 60 of the request cell C1 receives the reply data DR from the crossbar switch 9. The reply data DR indicates that the status is "P" and the owner cell is cell C3. In this case, the reply data control unit 60 waits for the reply data from the owner cell C3.

Step S16: Owner Cell C3: Issuing the Snoop Processing and the Reply Write Back

The CPU request control unit 10 of the owner cell C3 receives the snoop request issued by the home cell C2. Then, the CPU request control unit 10 issues the snoop request in the CPU 2-3-1 to 2-3-*m* of its own cell C3. Each cache 7 of CPU 2-3-1 to 2-3-*m* executes the snoop processing. As a result, the CPU 2-3-1 showing the cache status of "M" issues the "reply write back" to the CPU request control unit 10. The snoop request information is copied in the reply write back, and the read target address A0 and the read request issuing source (request cell C1) are included. Moreover, the reply write back includes the data read-out from the cache 7 (write back data). The read target address A0 is also a write back target address A0 from which the write back data is rewritten. Also in response to the reply write back issued, the cache status of the cache 7 of the CPU 2-3-1 is modified from "M" to "I".

The CPU request control unit 10 of the owner cell C3 when receiving the reply write back from the CPU 2-3-1 transmits the reply write back via the crossbar switch 9 to the home cell C2 (Step S16-1). The home cell C2 is determined unconditionally by the write back target address A0.

Moreover, the CPU request control unit 10 of the owner cell C3 directly transmits the data read-out from the cache 7 (reply data DR') to the request cell C1 (Step S16-2). The destination of the transmission (request cell C1) can determine based on the issuing source information of the snoop request or the read request included in the reply write back.

Step S17: Request Cell C1: Reception of the Reply Data DR'

The reply data control unit 60 of the request cell C1 directly receives the reply data DR' through the crossbar switch 9 from the owner cell C3. In this case, the reply data control unit 60 discards the reply data DR received from the aforementioned Step S15. Then, the reply data control unit 60 transmits the reply data DR' received from the owner cell C3 to the CPU 2-1-1 that is the issuing source of the read request. The CPU 2-1-1 when receiving the reply data DR', registers the reply data DR' in its own cache 7. In this case, the cache status of the cache 7 of the CPU 2-1-1 is modified from "I" to "E". As mentioned above, the process from issuing the read request to the reception of the reply data DR' is implemented by 3HOP.

Step S18: Request Cell C1: Issuing the Request Write Back

After Step S17, the CPU 2-1-1 rewrites the data stored in the cache 7 with new data. That is, the data stored in the cache 7 is updated. In this case, the status of the cache 7 is temporarily modified from "E" to "M". Moreover, the CPU 2-1-1 issues a "request write back" to the CPU request control unit 10 in response to the data updating in the cache 7. In response to the issuing of the request write back, the cache status of the cache 7 of the CPU 2-1-1 is modified from "M" to "I". This request write back includes the latest data stored in the cache 7 (write back data), write back target address A0, issuing source information (CPU 2-1-1 of the request cell C1), and directory update information. If the cache status is modified to "I", the directory update information is set to "U update".

For reference, the case is considered when another CPU 2-1-2 issues a read request for its data after the status of the cache 7 of the CPU 2-1-1 is modified from "E" to "M". In this case, the data stored in the cache 7 of the CPU 2-1-1 shifts to the cache 7 of the CPU 2-1-2 due to the snoop processing. While the cache status of the CPU 2-1-1 is modified from "M" to "I", the cache status of the CPU 2-1-2 is modified from "I" to "E". In this case, since the cache status in the cell C1 contains "E", the directory update information of the request write back issued by the CPU 2-1-1 can be set to "NC update".

The CPU request control unit 10 of the cache coherency circuit 3-1, when receiving the request write back (U update) determines the home cell C2 to become the access destination based on the write back target address A0 and then, the CPU request control unit 10 transmits the request write back to the home cell C2 via the crossbar switch 9.

Step S19: Home Cell C2: Detecting the Request Write Back

The crossbar request control unit 20 of the cache coherency circuit 3-2 in the home cell C2 receives the request write back from the request cell C1 and then, the crossbar request control unit 20 transfers the request write back received to the main pipe unit 30. The arbitration control circuit 35 of the main pipe unit 30 performs arbitration between the request write back and the request from the CPU request control unit 10.

Once the request write back from the crossbar request control unit 20 acquires arbitration, the request write back is transferred to the write back detection circuit 32 and the discard determination circuit 34. In the write back detection circuit 32, the address information comparator 321 detects that the address information 312 of the snoop management table 31 shown in FIG. 11 ("A0") agrees with the write back target address A0 shown by the request write back. Also, the cell information comparator 322 detects that the cell information 313 of the snoop management table 31 shown in FIG. 11 ("C1") agrees with the issuing source information shown by the request write back ("C1"). And then, the agreement entry is detected by calculation of AND 323. In this case, the write back detection circuit 32 updates the write back detection information 314 of the agreement entry in the snoop management table 31. Specifically, the detection flag of the agreement entry is set to be "1". Also, according to the directory update information included in the request write back (U update), the directory update information of the agreement entry is set to be "U".

As explained above, in the home cell C2, it is stored that the request write back for the address A0 is detected. Also, the snoop management table 31 is updated. Consequently, the main pipe unit 30 (discard determination circuit 34) transmits the request write back to the directory access control unit 40 and the main memory access control unit 50.

Step S20: Home Cell C2: Directory Access, Memory Access

The main memory access control unit 50 of the home cell C2, in response to the request write back received, rewrites the write back data in the write back target address A0 in the main memory 5-2.

Also, the directory access control unit 40, in response to the request back received, indexes and updates the directory 4-2. As shown in FIG. 11, in the directory 4-2, the owner cell information is "cell C3". Namely, as a result of indexing in the directory 4-2, the issuing source information shown by the request write back (Request cell C1) is found to be different from the owner cell information in the directory 4-2 (Owner cell C3). In this case, with reference to FIG. 9, the directory access control unit 40 does not update status of the directory 4-2 and the owner cell information (NC: No change).

Step S21: Home Cell C2: Discard the Reply Write Back

The home cell C2 receives a "reply write back" by the aforementioned Step S16-1 after the "request write back" by Step S19. The crossbar request control unit 20 of the cache coherency circuit 3-2 in the home cell C2 receives the reply write back from the owner cell C3 and then, the crossbar request control unit 20 transfers the reply write back received to the main pipe unit 30. The arbitration control circuit 35 of the main pipe unit 30 performs arbitration between the reply write back and the request from the CPU request control unit 10.

Once the request write back from the crossbar request control unit 20 acquires arbitration, the reply write back is transferred to the write back detection circuit 32 and the discard determination circuit 34. In the write back detection circuit 32, the address information comparator 321 performs a comparison between the write back target address A0 shown by the reply write back and the address information 312 of the snoop management table 31 and then, the write back detection circuit 32 informs the address agreement entry that agrees with the write back target address A0, to the discard determination circuit 34.

The discard determination circuit 34, when receiving the reply write back, reads out the write back detection information 314 of the address agreement entry in the snoop management table 31. As shown in FIG. 11, the detection flag of the address agreement entry is set to be "1". This means that the request write back has already been performed. As a result, the discard determination circuit 34 recognizes that the request write back has been performed prior to the reply write back. In this case, the discard determination circuit 34 discards the reply write back (Discard) and does not output the reply write back to the main memory access control unit 50. As a result, this prevents that the data updated by the request write back from the request cell CR from being overwritten by the old data by the reply write back from the owner cell C0.

Step S22: Home Cell C2: Updating the Directory

Also, the discard determination circuit 34 when referring to the write back detection information 314, detects that the directory update information of the address agreement entry is set to be "U" (See FIG. 11). In this case, the discard determination circuit 34 issues an "update request (U update)" to the directory access control unit 40. The directory access control unit 40 updates the directory 4-2 in response to the update request received. According to the regulations shown in FIG. 9, in the case of reply write back, "NC" is given, but in the present case, the "update request (U update)" is prioritized. Thus, the directory access control unit 40 modifies the status of the directory 4-2 from "P" to "U" in response to the update request to delete the owner cell information. As shown in FIG. 11, it is found that there is no incoherency among the cache status of the cell C1 ("I"), the status of the directory 4-2 of the cell C2 ("U"), and the cache status of the cell C3 ("I"). That is, coherency is maintained among the cells.

When the reply write back is received, the write back detection circuit 32 initializes the address agreement entry in the snoop management table 31 based on the outputs from the address information comparator 321. Specifically, the write back detection circuit 32 returns the V bit 311 regarding the address agreement entry to "0". This ends a series of processing.

Also, the processing in the case when the home cell C2 receives the reply write back before the request write back is as follows. Since the detection flag of the write back detection information 314 is still "0", the discard determination circuit 34 outputs the reply write back to the directory access control unit 40 and the main memory access control unit 50. As a result, the write back is executed as usual and the write back data is rewritten in the address A0. According to the rules shown in FIG. 9, the status of the directory 4-2 is maintained to be "P" and the owner cell information is modified from "Cell C3" to "Cell C1 (Request cell)". The cell C1, is designated by the "issuing source information of the request cell" included in the reply write back. Also, this entry is initialized by the reply write back. Thus, even though the request write back is received later, the detection flag of the write back detection information 314 will not be validated. Only the request write back is executed directly.

4. Summary

As mentioned above, according to the present invention, assurance of coherency and shortening of latency can be implemented even in such a state that the request cell CR, home cell CH and owner cell CO are different.

When an access occurs from the request cell CR to the cache 7 of the owner cell CO, the owner cell CO returns the latest data to the request cell CR at the same time as the write back to the main memory 5. As a result, it is possible to implement latency from the state of issuing the read request to the state of receiving the reply data by 3HOP.

Also, if a snoop management table 31, a write back detection circuit 32, and a discard determination circuit 34 are installed in the cache coherency circuit 3-j loaded in the cell Cj, the following functions are provided to each cell Cj: (1) a function of registering the read request from the request cell CR, (2) a function of validating the detection flag when a request write back is detected for the same address as that of the target address of the read request as registered, (3) a function of discarding the reply write back received by referring to the aforementioned detection flag when the reply write back is received after the request write back, and (4) a function of updating the directory along with discarding the reply write back. These functions prevent that the updated data by the request write back from the request cell CR is overwritten by the old data by the reply write back from the owner cell CO. Thus, despite the differences in the pathways between the request write back and the reply write back, it is possible to assure coherency. In other words, even though the owner cell CO directly transmits the reply data DR' to the request cell CR, coherency among the cells can be maintained.

As explained above, according to the present invention, while assuring coherency, it is possible to implement the latency from the process of issuing the read request to the process of receiving reply data by 3 HOP. That is, both assurance of coherency and shortening of the latency (improvement in processing speed) can be implemented. This invention demonstrated a further greater effect in large-scale multiprocessor systems wherein the distance between the request cell CR and the home cell CH (number of HOPs) and the distance between the home cell CH and the owner cell CO become greater.

What is claimed is:

1. A multiprocessor system, comprising:
multiple cells respectively including a processor, a cache memory and a main memory; and
a network for connecting the multiple cells,
wherein a third cell stores, in the cache memory, a latest version of target data in a main memory of a second cell,
wherein a first cell issues a read request for said target data to said second cell,
wherein said second cell issues a snoop request to said third cell in response to said read request,
wherein said third cell directly transmits said latest version of target data to said first cell in response to said snoop request and transmits a reply write back to said second cell,
wherein said first cell issues a request write back to a same address as that of said target data in said second cell,
wherein said second cell discards said reply write back if said reply write back from said third cell is received from said first cell after said request write back,
wherein said second cell determines whether said second cell receives said reply write back from said third cell after receiving said request write back from said first cell or not, and said second cell discards said received reply write back if said second cell receives said reply write back after receiving said request write back,
wherein each of the cells further comprises a directory,
wherein the first cell allows the request write back to include directory update information for coherency between a status of the cache in the first cell and a directory of the second cell,
wherein, if the second cell receives the reply write back after the request write back, the second cell discards the reply write back and updates a status of the directory based on the directory update information,
wherein each of the cells further comprises a snoop management table,
wherein the read request includes a request cell information showing a request issuing source and an address information showing a read target address, and
wherein the request cell information and the address information are registered in the snoop management table in response to the read request,
wherein each of the cells further comprises a write back detection circuit,
wherein the snoop management table includes the registered request cell information and a detection flag corresponding to the address information, and
wherein the write back detection circuit of the second cell detects the request write back for a same address as the read target address indicated by the registered address information, and if the request write back is detected, the detection flag is validated.

2. The multiprocessor system according to claim 1, wherein the request write back includes a request write back cell information showing a request issuing source, and a write back address information showing the write back target address, and
wherein the write back detection circuit of the second cell compares each of the request write back cell information and the write back address information with the request cell information and address information registered in the snoop management table, in order to detect the request write back for the same address as the read target address.

3. The multiprocessor system according to claim 1, wherein the second cell initializes the request cell information and address information as registered in the snoop management table in response to the reply write back.

4. The multiprocessor system according to claim 1, wherein the directory includes information showing the cells having latest data regarding the data of all addresses in the main memory of the third cell,
wherein the second cell references the directory in response to the read request, to recognize that the latest version of a read target address data is stored in the third cell, and the third cell issues a second snoop request.

5. The multiprocessor system according to claim 4, wherein the second snoop request includes the information contained in the read request, and
wherein the third cell recognizes that the transmission destination of the target data is the first cell based on the request cell information included in the snoop request, and the target data read from the cache is directly transmitted to the first cell.

6. The multiprocessor system according to claim 1, wherein each of the cells further comprises a discard determination circuit, and
wherein the discard determination circuit of the second cell references a detection flag in response to the reply write back from the third cell, and if the detection flag is validated, the reply write back is discarded.

7. The multiprocessor system according to claim 6, wherein the write back detection circuit of the second cell validates the detection flag and the directory update information shown by the request write back is stored in the snoop management table in response to the detection flag as validated, and
wherein the discard determination circuit of the second cell references the detection flag and the directory update information in response to the reply write back from the third cell, and the reply write back is discarded and a status of the directory are updated based on the directory update information.

8. A method of operating a multiprocessor system, the multiprocessor system comprising multiple cells, said cells respectively including a processor, a cache memory, and a main memory, and a network for connecting the multiple cells, wherein a latest version of target data stored in the main memory of a second cell is stored in the cache memory of a third cell, the operational method comprising:
issuing a read request for the target data to the second cell, by the first cell;
issuing a snoop request to the third cell in response to the read request, by the second cell;
directly transmitting, by the third cell, the target data to the first cell in response to the snoop request;
issuing a reply write back, by the third cell, to the second cell in response to the snoop request;

issuing a request write back for the same address as that of the target data in the second cell, by the first cell; and discarding of the reply write back, by the second cell, when the reply write back from the third cell is received later than the request write back from the first cell, wherein said second cell determines whether said second cell receives said reply write back from said third cell after receiving said request write back from said first cell or not, and said second cell discards said received reply write back if said second cell receives said reply write back after receiving said request write back, wherein each of the cells further comprises a directory, wherein, in the issuing of the request write back for the same address as that of the target data in the second cell, by the first cell, the request write back includes directory update information for coherency between a status of the cache contained in the first cell and a status of the directory of the second cell, wherein, if the second cell receives the reply write back after the request write back, the second cell discards the reply write back and updates the status of the directory based on the directory update information, wherein each of the cells further comprises a snoop management table, wherein the read request includes a request cell information showing a request issuing source and an address information showing a read target address, and wherein the request cell information and the address information are registered in the snoop management table in response to the read request, wherein each of the cells further comprises a write back detection circuit, wherein the snoop management table includes the registered request cell information and a detection flag corresponding to the address information, and wherein the write back detection circuit of the second cell performs a detecting of the request write back for a same address as the read target address indicated by the registered address information, and if the request write back is detected, the detection flag is validated.

9. A multiprocessor system, comprising a plurality of cells, each cell comprising a processor and a memory unit, wherein one of the plurality of cells comprises a request cell that issues a read request, wherein one of the plurality of cells comprises a home cell that receives the read request from the request cell, said home cell possessing target data wherein, after an issuance of a read request, the home cell determines that one of the plurality of cells has a cache storing a latest version of said target data, said one cell having the latest version being an owner cell, and, upon determining a location of the owner cell, said home cell issues a snoop request to the owner cell, wherein, upon receiving the snoop request, the owner cell reads the latest version of said target data and issues a reply write back to the home cell and directly transmits the latest version of said target data to the request cell as reply data, wherein said home cell determines whether said home cell receives said reply write back from said owner cell after receiving said request write back from said request cell or not, and said home cell discards said received reply write back if said home cell receives said reply write back after receiving said request write back, wherein, upon receipt of the reply data from the owner cell, said request cell issues a request write back to the home cell, and wherein the home cell creates a detection flag upon detecting the request write back for the same target address as that of a registered read request.

10. The multiprocessor system according to claim 9, wherein, upon receipt of the reply data from the owner cell, said request cell issues a request write back to the home cell.

11. The multiprocessor system according to claim 9, wherein, upon receipt of the reply write back from the owner cell, said home cell discards the received reply write back by referring to the detection flag if the reply write back is received later than the request write back.

12. The multiprocessor system according to claim 9, wherein said home cell comprises a main memory directory to store a status of where all latest versions of data are stored.

13. The multiprocessor system according to claim 9, further comprising:
a crossbar switch, said plurality of cells beings associated with each other across said crossbar switch, and
a cache coherency circuit associated with said cross bar switch, said cache coherency circuit being configured to manage requests between the plurality of cells, said cache coherency circuit updating information for coherency between a cache status of a cache of the request cell and a status of a directory of the home cell.

14. The multiprocessor system according to claim 9, further comprising a main pipe unit, said main pipe unit configured to register a read request from the request cell, storing the detection results when detecting the request write back for the same target addresses as those for a read request as registered, and controlling requests for the directory access control unit and the main memory access control unit.

15. The multiprocessor system according to claim 9, further comprising a cancel determination circuit, said cancel determination circuit configured to determine if a read request for a certain read target address has already been registered in a snoop management table, the cancel determination circuit requests reissuing of the read request until there is a free entry in the snoop management table if the read request has not been registered.

* * * * *